May 26, 1953   R. L. PAPERMASTER   2,639,614
THERMOMETER CASE WITH MEANS FOR SWINGING THE SAME
Filed Sept. 9, 1948
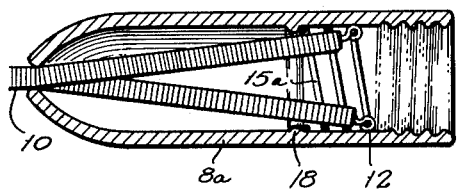
Fig. 6
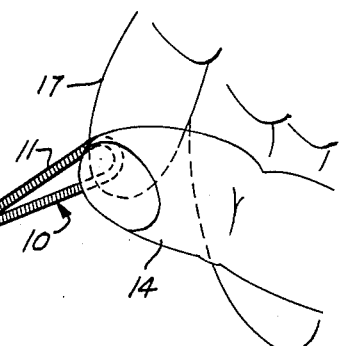
Fig. 1.
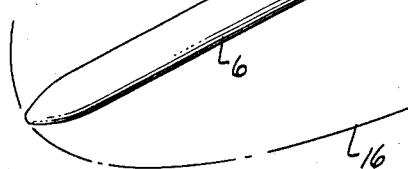
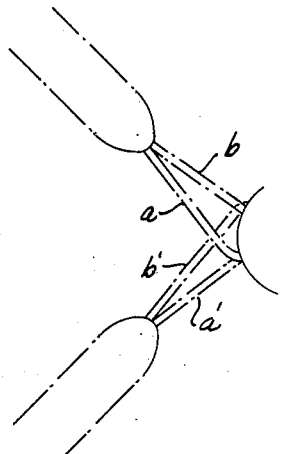
Fig. 2.
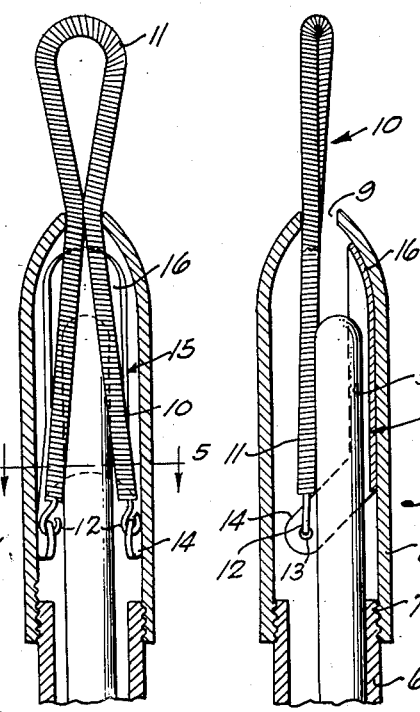
Fig. 4.   Fig. 3.
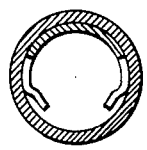
Fig. 5.
INVENTOR.
Roy L. Papermaster
BY Lynn Latta
ATTORNEY Patented May 26, 1953

2,639,614

UNITED STATES PATENT OFFICE 2,639,614

THERMOMETER CASE WITH MEANS FOR SWINGING THE SAME

Roy L. Papermaster, Beverly Hills, Calif.

Application September 9, 1948, Serial No. 48,438

8 Claims. (Cl. 73—373)

1

This invention relates to a thermometer case having means whereby the case may be swung in a generally circular path so as to subject a thermometer therein to centrifugal force, thereby to "shake down" the fluid from the tubular portion of the thermometer into the bulb thereof.

There have been a number of prior proposals for a thermometer case of this general plan. One of the proposes to utilize a cord or chain attached to the cover portion of the thermometer case and adapted to be wrapped and unwrapped from the finger of the operator as the case is swung. An objection to this device is the length of the cord or chain which tends to become tangled, knotted, or detached from the case during continued use thereof. Another prior proposal has been that of employing a short length of chain attached at one end to the case and at another end to a safety pin. A still further proposal of which I am aware is the proposed use of a bar transversely swiveled with reference to one end of the case and having at one end a loop through which the finger of the operator may be passed in order to support the bar for rotation of the case thereon. Such an arrangement is rather difficult and expensive to manufacture and assemble. All of these arrangements, and, so far as I am aware, any that have been proposed heretofore, provide for either a purely circular or a gradually spiraling path of movement of the thermometer case, and therefore depend upon a comparatively steady centrifugal pull on the fluid in the thermometer to effect the "shaking down" action.

The modern fever thermometer, with its extremely fine hairline duct in the stem thereof, is not easy to shake down. The capillary attraction of this minute duct is so great, and the weight of the fluid in the duct is so infinitesimal, that an extremely high degree of force must be applied to the thermometer in order to assure the amalgamation of the fluid into a single continuous column.

With these problems in mind, my invention has as one of its objects to provide a fever thermometer case having means whereby it may be swung in a path that, although generally circular, departs from a circular path by the reciprocation of the center of rotation back and forth, whereby to apply to the thermometer a combination of centrifugal force that is greatly accentuated at the two positions of greatest distance from the general center of rotation.

Another object of the invention is to provide a thermometer case having an extremely simple and inexpensive attachment to provide for the swinging movement above referred to.

In my pending application Serial No. 704,258, filed October 18, 1946, now U. S. Patent 2,456,837, I have shown a thermometer case having means for swinging it in a path that departs from the circular as stated above. A particular object of the present invention is to provide an improved means for holding a thermometer so that it may be swung in such a path, such means being of improved durability, less expensive, and more reliable than the device of my former invention. In particular, the present invention makes it possible to eliminate the ring which was provided in the earlier device, for grasping between the fingers, while retaining the advantages of the ring.

Other objects of the invention will become apparent in the ensuing specifications and appended drawings in which:

Fig. 1 is a perspective view illustrating the operation of a thermometer case embodying my invention;

Fig. 2 is a schematic view further illustrating the operation;

Fig. 3 is an axial sectional view through my improved thermometer case;

Fig. 4 is an axial sectional view of the same taken in a plane at right angles to that of Fig. 3;

Fig. 5 is a transverse sectional view taken on the line 5—5 of Fig. 4, omitting the spring; and Fig. 6 is an axial sectional view through a thermometer case cap embodying a modified form of the invention.

Referring now in particular to the drawings, I have shown therein a thermometer case for a fever thermometer including a stem portion 5 and a bulb which is not illustrated. The case comprises a barrel 6 having an externally threaded end 7, and a cap 8 having an internally threaded end to be joined to the threaded end 7. The other end of the cap 8 is provided with an opening 9 through which is extended the two halves of a coil spring 10 which is folded back upon itself to provide a loop 11. The ends of the spring are provided with conventional hooks 12 which are hooked through openings 13 in arms 14 of an anchor 15. The anchor 15 is mounted in the cap 8 with the arms 13 pressing outwardly against the wall of the cap and frictionally engaging the same. The arms 13 extend past the axis of the cap and position the ends of the spring 10 at one side of the axis so as to provide a space to receive the head of the thermometer 5. The ends of the spring diverge from the aperture 9 to the arms 14, so as to better receive the thermometer. When thus received in this space, the thermometer is confined between the two ends of the spring and the anchor 15 so as to be restrained from sidewise rattling in the case.

The pull of the spring against the arms 14 tends to press the tail 16 of the anchor against the wall of the cap on one side thereof, and to pull the arms 14 toward the other side of the cap, i. e., to rotate the anchor about a transverse axis intermediate its ends. Such movement is resisted by the engagement of the tail 16 of the anchor against the wall of the cap on the one side and the engagement of the arms 14 against the wall on the other side of the axis. Any tendency of the anchor to slide longitudinally in the cap is resisted by the engagement of the end of the anchor against the end of the cap. As shown in Fig. 5, the tail 16 is curved in cross section to conform roughly to the contour of the inner wall of the cap.

The natural resiliency of the spring 10 (a coil spring) maintains the loop 11 normally distended as shown in Fig. 4. This provides a handle which may be readily grasped in the hand, between the thumb 14 and the forefinger 15 as shown in Fig. 1. An extremely good grip may be obtained upon the loop 11 because of the entrance of the soft, fleshy balls of the finger and thumb into the space inside of the loop, and because of the roughness provided by the coils of the spring.

The arms 14 are located near the open end of the cap so that the loop 11 is connected to the cap by lengths of spring material which are several times the length of that portion of the spring normally projecting beyond the end of the cap.

In the operation of the thermometer case, the loop 11 is grasped between the thumb and forefinger as shown in Fig. 1 and the case is twirled in a generally circular path as indicated by the arrow 16. The centrifugal force developed in the case will cause the spring 10 to stretch, and the length of the spring extending beyond the end of the case will be substantially doubled, or, in any event, greatly increased. As the case moves from a position at one extremity of its orbit to a position at an opposite extremity of the orbit, first one side and then the other side of the loop 11 will be stretched to a considerably greater extent than the opposite side. This is illustrated in Fig. 2, in which, in one position of the case, the side $a$ is longer than the side $b$, whereas at the opposite extremity of swing, the side $a$, indicated at $a'$, is shorter than the side $b$, indicated at $b'$. At an intermediate point in the path of swing, the tension in the two sides of the loop will be substantially equalized. As the result of this characteristic of operation, there will be developed an uneven movement in which the case vibrates between points at a maximum radius from the center of swing and points at a minimum radius. At the point of maximum radius, the centrifugal force will rise to a peak, which will be considerably higher than the force that could be developed by a uniform swing in a truly circular orbit. Stated somewhat differently, the movement of the case comprises a series of jerks at remote points on the path 16, as the elastic limit of the spring 10 is reached, at which remote points, the centrifugal force mounts momentarily to a value much higher than its average value. The degree of force thus applied to the case at these remote points in the path of travel is much higher than can be applied by holding the thermometer between the fingers and shaking it in the conventional manner, particularly since the speed that can be imparted to the movement of the case, when swung in this manner, is much greater than the speed that can be imparted directly through the movement of the hand holding the thermometer and the abruptness of the changes in movement is much greater because of the increased speed.

The coil spring 10 is very durable and strong and at the same time highly resilient so as to provide a maximum extenuation of swing through the vibrating action referred to above.

The preferred form of the invention is shown in Fig. 6, wherein the ends of the spring 10 are secured by an anchor 15$a$ in the form of a coil spring. Eyes 12 on the ends of the spring 10 are looped around the remote coil of the spring 15$a$. The near end of the spring 15$a$ is abutted against a shoulder 18 in the cap 8$a$. The normal diameter of anchor spring 15$a$ in its unstressed state is larger than the interior diameter of the cap 8$a$, so that the spring will be confined under radial compression, exerting an outwardly expanding force against the wall of the cap 8$a$, so that its near end will not slip past the shoulder 18, which may be in the form of an internal bead. It is also possible to utilize such radial expansion to cause a sharp end of the spring 15$a$ to "dig" into the wall of the cap so as to anchor the spring 15$a$ against axial displacement, without employing the shoulder 18.

In operation, the spring 15$a$ may add its yieldability to that of the spring 10 so as to increase the elongation of the latter beyond the tip of the cap 8$a$ under centrifugal force.

I claim:

1. In a thermometer case, a pair of case sections having means by which they may be secured together, one of said sections having a closed end provided with an opening, a coil spring having its respective end portions doubled back upon themselves to form a loop and extended through said opening and attached at their ends to said one section interiorly thereof, said loop projecting exteriorly beyond the end of said one section to provide a handle to be grasped between the thumb and forefinger and held tightly while the case is swung in a generally circular path, the respective sides of said loop being adapted to alternately increase and decrease the amount of their distension as the result of the movement of the case in said generally circular path while the extremity of said loop is held against rotation, whereby to induce in said case a vibrating or jerking movement for developing periodically, maximum stages of centrifugal force in said case and its contents.

2. A thermometer case as defined in claim 1, including an anchor mounted in said one case section, said anchor including a pair of arms to which the ends of the spring are respectively attached, and a tail portion extending toward said closed end and bearing against the wall of said one section.

3. A thermometer case as defined in claim 1, in which the majority of the free length of said spring is normally disposed within said one case section and the smaller part thereof projects outwardly thereof.

4. In a thermometer case, a pair of case sections having means by which they may be secured together, one of said sections having a closed end provided with an opening, a coil spring extending through said opening and having an end anchored to the inner wall of said one section at a point nearer the open end than the closed end thereof, said spring being otherwise free along its entire length, said spring having an exterior free portion to be utilized as a handle for swinging the case in a generally circular path, said exterior free portion in the normal, unstressed state of the spring, being shorter than the portion of the spring which is disposed within said one section.

5. A thermometer case as defined in claim 4, wherein said one case section has an internal annular shoulder, and including an anchor in the form of a coil spring one end of which is engaged against said annular shoulder, said first mentioned spring having an end attached to a coil of said anchor spring.

6. In a thermometer case, a pair of case sections having means by which they may be secured together, one of said sections having a closed end provided with an opening, an elongated, stretchable resilient element extending through said opening and having an end anchored to the inner wall of said one section at a point nearer the open than the closed end thereof, said element being otherwise free along its entire length, and including an exterior free portion to be utilized as a handle for swinging the case in a generally circular path, said exterior free portion, in the normal, unstressed state of said resilient element, being shorter than the portion of said resilient element which is disposed within said one section.

7. A thermometer case as defined in claim 6, including an anchor comprising a tail portion fitted against the inner wall of said one case section and a pair of laterally spaced arms engaging, under compression, opposite areas of said inner wall for securing said anchor therein, an end of said resilient element being attached to an arm of said anchor.

8. A thermometer case as defined in claim 6, including an anchor element secured within said one case section, the inner end of said resilient element being anchored to said anchor at a point adjacent one side of said one case section.

ROY L. PAPERMASTER.

References Cited in the file of this patent

UNITED STATES PATENTS

| Number | Name | Date |
| --- | --- | --- |
| 1,019,289 | Zeal | Mar. 5, 1912 |
| 2,456,837 | Papermaster | Dec. 21, 1948 |